US005814907A

United States Patent [19]

Bandera

[11] Patent Number: 5,814,907

[45] Date of Patent: Sep. 29, 1998

[54] ELECTROMAGNETIC FORCE MOTOR WITH INTERNAL EDDY CURRENT DAMPING

[75] Inventor: Pablo Bandera, Buffalo, N.Y.

[73] Assignee: Moog Inc., East Aurora, N.Y.

[21] Appl. No.: 851,950

[22] Filed: May 5, 1997

[51] Int. Cl.[6] .................................................... H02K 41/00

[52] U.S. Cl. ............................. 310/14; 310/105; 310/23; 310/17; 335/100; 335/179; 335/236

[58] Field of Search .................................... 310/181, 104, 310/105, 12, 14, 15, 182, 183, 17, 23; 335/99, 100, 103, 147, 177, 179, 183, 236, 237; 300/17, 23

[56] References Cited

U.S. PATENT DOCUMENTS

| | | | |
|---|---|---|---|
| 4,253,493 | 3/1981 | English | 137/625.18 |
| 4,482,829 | 11/1984 | Tardieu et al. | 310/105 |
| 4,757,224 | 7/1988 | McGee et al. | 310/168 |
| 5,012,144 | 4/1991 | Huitema et al. | 310/14 |
| 5,054,587 | 10/1991 | Matsui et al. | 310/105 |
| 5,365,210 | 11/1994 | Hines | 335/238 |
| 5,389,910 | 2/1995 | Abel | 335/238 |

*Primary Examiner*—Thomas M. Dougherty
*Assistant Examiner*—B. Mullins
*Attorney, Agent, or Firm*—Phillips, Lytle, Hitchcock, Blaine & Huber LLP

[57] ABSTRACT

The invention is directed to an improved electromagnetic force motor (10) with internal eddy current damping. In the preferred embodiment, the motor is comprised of a body (11), a pair of permanent magnets ($\mathbf{15}_L$, $\mathbf{15}_R$), an electromagnetic coil (20), and an armature (13). The armature is positioned with respect to the body so as to define two variable-reluctance working air gaps (30, 31) and a constant-reluctance non-working air gap (29). The permanent magnets face one another and are mounted on the body. The body and armature are both adapted to conduct magnetic flux. Each working air gap contains a magnetic flux that is the algebraic sum of a flux attributable to the permanent magnets and a flux attributable to the coil. The non-working air gap contains flux attributable only to the permanent magnets. A current-conducting member (14) is attached to the armature and positioned within the non-working air gap. The current-conducting member moves linearly in the non-working air gap in a direction substantially perpendicular to the flux therein such that eddy currents are induced in the member. The elements of the motor are configured such that the eddy currents are a function of the velocity of the armature relative to the body, but are not a function of changes in the flux either attributable to the coil or attributable to the position of the armature. The eddy currents provide damping of armature velocity, and result in an electromagnetic force motor with improved dynamic performance and greater stability.

5 Claims, 5 Drawing Sheets

ELECTROMAGNETIC FORCE MOTOR WITH INTERNAL EDDY CURRENT DAMPING

TECHNICAL FIELD

The present invention relates generally to the field of electromagnetic actuators and motors, and, more particularly, to an improved electromagnetic force motor having an internal eddy current damper for damping velocity of an armature relative to a body.

BACKGROUND ART

A variety of electromagnetic motors and actuators have been developed heretofore. These devices range from simple solenoids to complex motors, and are typically configured to operate either linearly or rotationally. Examples of these devices are representatively disclosed in U.S. Pat. Nos. 4,631,430 and Re. 34,870, the aggregate disclosures of which are hereby incorporated by reference. These references also provide a discussion of the fundamental scientific principles underlying electromagnetic force motor operation.

Such force motors typically comprise an armature, a pair of permanent magnets, an electromagnetic coil, and a magnetic flux-conducting body. The permanent magnets and the coil, when energized, produce magnetic fluxes which the body and armature are adapted to conduct.

The armature is movable with respect to the body so as to create a number of variable-reluctance working (i.e., variable-length or variable-area) air gaps. In addition, the armature is positioned with respect to the body to define a constant-reluctance non-working air gap between the permanent magnets and the armature. In operation, the working air gaps contain a net magnetic flux that is the algebraic sum of individual fluxes attributable to the permanent magnets and the coil. The net flux contained within these variable-reluctance air gaps varies with the polarity and magnitude of the electrical current supplied to the coil and the position of the armature with respect to the body. A resulting force or torque tending to move the armature will be produced as a function of the flux contained in the working air gaps.

Such electromagnetic force motors are typically used to directly drive high-response hydraulic servovalves. The dynamic performance of such valves is generally limited by the mechanical resonance of the motor/valve system. This resonance is primarily a function of the load inertia, and the effective spring rate of the motor. Servovalves with a lightly-damped resonance sometimes experience system instability and related dynamic control problems. It is well known that valve performance and dynamic response may be improved by the use of mechanical damping forces. One method of providing damping is through the introduction of eddy currents in a current-conducting member which interacts with the motor magnetic flux.

Eddy currents are an electromagnetic phenomena whereby circulating electrical currents are induced within electrically-conductive materials. The generation of such currents is, in part, described by Lenz's Law. Lenz's Law states generally that an electric current will be generated within a conductive loop or closed circuit any time the conductor is moved through a magnetic field so as to cut lines of magnetic flux. The resulting eddy current flow will be in a direction to produce a force that opposes the motion that induced the current and that is proportional to the velocity of the motion. When generated in an electromagnetic motor, such eddy currents may exert a viscous-like drag on the armature so as to damp motor dynamic response. Similarly, eddy currents will also be generated in a stationary conductor which is exposed to a magnetic field of varying strength wherein the lines of magnetic flux of an expanding or contracting magnetic field cut through the conductor.

An example of eddy current damping in an electromagnetic motor is found in U.S. Pat. No. 4,510,403. This patent discloses a limited-angle electromagnetic torque motor having a permanent magnet rotational armature and variable-area working air gaps. A stationary rotor casing, comprised of a material having high electrical conductivity, is positioned within the working air gaps. A net magnetic flux that is the algebraic sum of the electrical coil flux and the permanent magnet flux passes through the rotor casing. Eddy currents are generated within the casing, not by movement of the conductor through the magnetic field, but rather by variation of the magnetic field caused by movement of the rotor and variation of the coil current. Hence, the eddy currents are a function of both rotor angular velocity and dynamic variation of coil current. The result is a combination of desirable damping and undesirable dynamic lag. While this reference recognizes the use of eddy current damping in connection with system dynamic requirements, the reference does not appear to disclose or suggest a configuration in which eddy currents are generated in a current-conducting member by movement of the conductor through the relatively constant flux of a constant-reluctance non-working air gap so as to produce pure damping forces which are independent of coil current.

The prior art is not believed to teach an electromagnetic motor that implements eddy current damping by movement of a current-conducting member through a non-working air gap containing constant magnetic flux attributable primarily to a permanent magnet. It is further believed that the prior art fails to teach the use of eddy current damping where the eddy currents are not a function of the changes in magnetic flux attributable to the electromagnetic coil.

DISCLOSURE OF THE INVENTION

With parenthetical reference to the corresponding parts, portions or surfaces of the disclosed embodiment, merely for purposes of illustration and not by way of limitation, the present invention provides an improved electromagnetic motor (10) that broadly comprises an armature (13), a magnetically-conductive body (11), a pair of permanent magnets ($\mathbf{15}_L$, $\mathbf{15}_R$) and an electromagnetic coil (20).

The armature is mounted for limited displacement relative to the body. The armature and body are both adapted to conduct magnetic flux. The armature is mounted with respect to the body so as to define a number of variable-reluctance working air gaps (30,31) and at least one constant-reluctance non-working air gap (29). When the coil is energized, the net flux in each working air gap is the algebraic sum of a flux attributable to the permanent magnets and a variable flux attributable to the coil, whereas the non-working air gap contains a constant flux attributable only to the permanent magnets.

A cylindrical current-conducting member (14) is attached to the armature and is arranged to move in the non-working air gap in a direction having a component substantially perpendicular to the magnetic flux within the non-working air gap. Such motion will induce eddy currents in the current-conducting member that are a function of the velocity of the armature relative to the body, but that are not a function of the changes in the flux attributable to the coil or attributable to the position of the armature. The result of this arrangement is to provide ideal eddy current damping of the velocity of the armature.

The body and armature are operatively arranged to produce variable magnetic forces on the armature as a function of current in the coil. The current-conducting member is moved through the magnetic flux attributable to the magnets to produce eddy current damping of the velocity of the armature. The motor is so configured and arranged that magnetic flux attributable to changes in the current in the coil or attributable to changes in the position of the armature does not pass through the conducting member.

The armature may be configured to move in either a linear or a rotational manner with respect to the body. In addition, a means may be provided for adding an additional, separately-magnetized non-working air gap in order to produce a greater damping effect than that available from the magnets sized for desired motor force. One embodiment of this means includes the use of an additional pair of permanent magnets arranged to produce flux only in the added non-working air gap.

Accordingly, the general object of the present invention is to provide an improved electromagnetic motor with internal eddy current damping and improved dynamic response characteristics.

Another object of the invention is to provide an improved electromagnetic motor having at least two variable-reluctance working air gaps, and at least one constant-reluctance non-working air gap with a current-conducting member disposed in the non-working air gap.

Another object of the invention is to provide an additional, separately-magnetized non-working air gap and an additional pair of permanent magnets to produce flux only in the added non-working air gap.

Another object of the present invention is to provide an electromagnetic motor wherein the magnetic flux in the non-working air gap is maintained at a substantially constant level, and the conducting member is moved within such air gap.

Another object of the present invention is to provide an improved electromagnetic force motor which is readily modifiable, economical to manufacture, weight-efficient, reliable, rugged, and may be utilized with a variety of servovalve and actuator designs.

These and other objects and advantages will become apparent from the foregoing and ongoing written specification, the drawings, and the appended claims.

DESCRIPTION OF THE PREFERRED EMBODIMENTS

Figure 1:
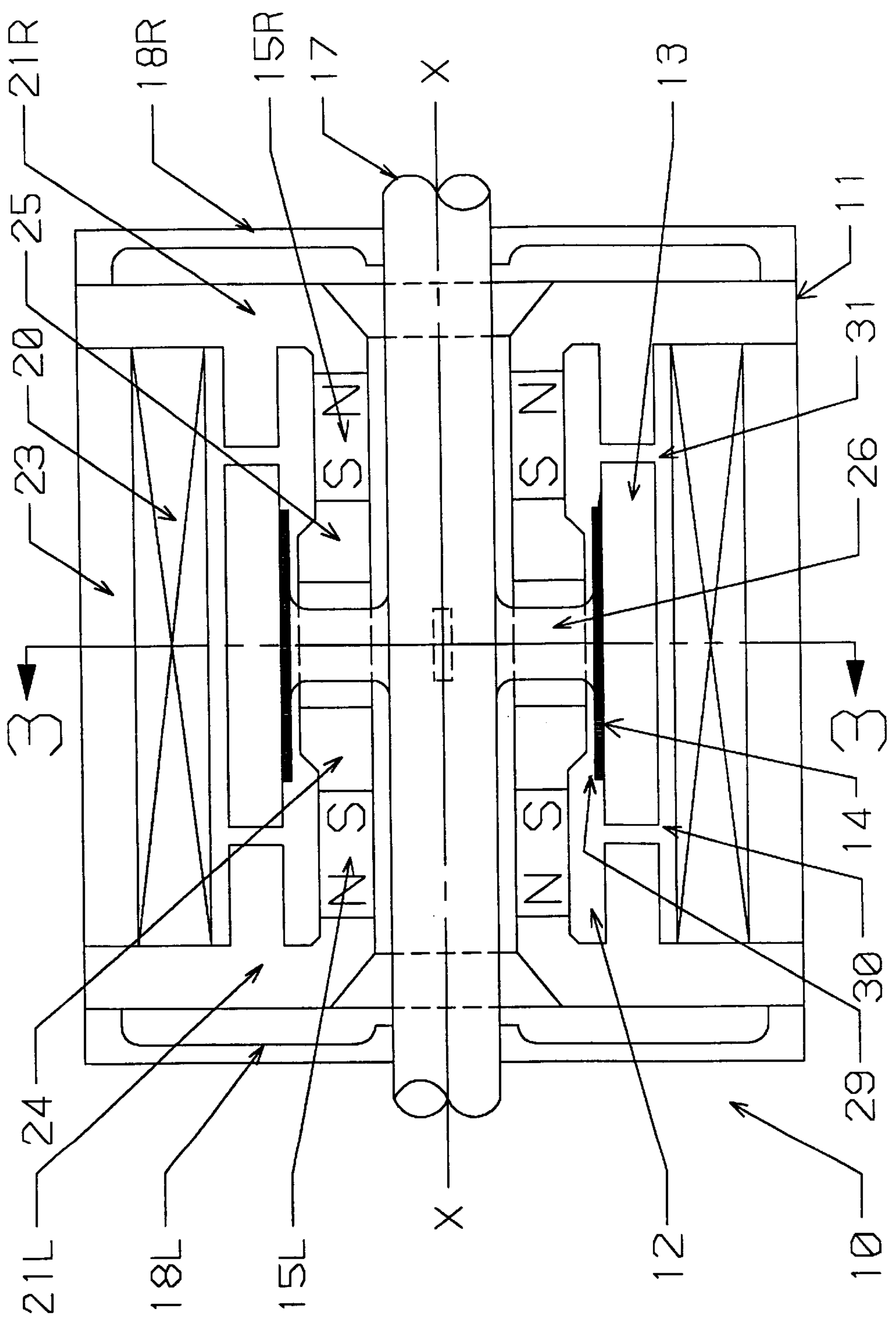
FIG. 1 is an unhatched fragmentary longitudinal vertical sectional view of a preferred embodiment of the improved electromagnetic force motor, showing the assembly of the various parts and components.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIG. 1 thereof, this invention provides an improved electromagnetic motor, of which the presently preferred embodiment is generally indicated at 10. The motor is shown as broadly including: a body 11, horizontally-elongated along axis x—x and having a horizontally-elongated annular chamber 12 therewithin; an armature 13 arranged within this chamber for linear movement relative to body 11 in the direction of axis x—x; a current-conducting member 14 attached to the armature; a left permanent magnet $\mathbf{15}_L$, a right permanent magnet $\mathbf{15}_R$, a drive rod 17, a pair of left and right springs $\mathbf{18}_L$, $\mathbf{18}_R$, respectively, for both restoring drive rod 17 to a neutral or central position, and for supporting armature 13 within annular chamber 12, and an electromagnetic coil 20. Magnets $\mathbf{15}_L$ and $\mathbf{15}_R$ are mounted coaxially on an inner portion of the body.

Body 11 is shown as being an assembly of several components and includes left and right polepieces $\mathbf{21}_L$ and $\mathbf{21}_R$, respectively, axially spaced along axis x—x, a hollow cylindrical outer housing 23 disposed therebetween, a left center polepiece 24, and a right center polepiece 25. Left polepiece $\mathbf{21}_L$ is shown as being a specially-configured solid member containing an axial through-bore, elongated along axis x—x, and is generally defined by a leftwardly-facing vertical annular surface, an inwardly- and leftwardly-facing frusto-conical surface, an inwardly-facing horizontal cylindrical surface, a rightwardly-facing vertical annular surface, an outwardly-facing horizontal cylindrical surface, a rightwardly-facing vertical annular surface, an inwardly-facing horizontal cylindrical surface, a rightwardly-facing vertical annular surface, an outwardly-facing horizontal cylindrical surface, a rightwardly-facing vertical annular surface, and an outwardly-facing horizontal cylindrical surface.

Right polepiece $\mathbf{21}_R$ is substantially a mirror image of left polepiece $\mathbf{21}_L$, and need not be specifically defined in that identical numerals bearing the subscript "R" are used to identify the corresponding parts, portions and surfaces of right polepiece $\mathbf{21}_R$.

Outer housing 23 is shown as being in the form of a thin-walled cylinder, horizontally-elongated along axis x—x, and sequentially bounded by a leftwardly-facing vertical annular surface, an inwardly-facing horizontal cylindrical surface, a rightwardly-facing vertical annular surface, and an outwardly-facing horizontal cylindrical surface.

Armature 13 is shown as being a hollow cylindrical iron member, elongated along axis x—x, and having a leftwardly-facing vertical annular surface, an inwardly-facing horizontal cylindrical surface, a rightwardly-facing vertical annular surface, and an outwardly-facing horizontal cylindrical surface. Current-conducting member 14 is shown as being a thin-walled cylindrical shell, axially elongated along axis x—x. Member 14 has an inwardly-facing horizontal cylindrical surface, and an outwardly-facing horizontal cylindrical surface. Armature 13 coaxially encircles, and is attached to, member 14.

Drive rod 17 is a substantially-cylindrical solid member elongated along axis x—x. Drive rod 17 extends through the aligned axial through-bores present in left polepiece 21$_L$, right polepiece 21$_R$, magnet 15$_L$ and magnet 15$_R$ . As drive rod 17 translates linearly in the direction x—x, armature 13 and member 14 translate with it.

Figure 3:
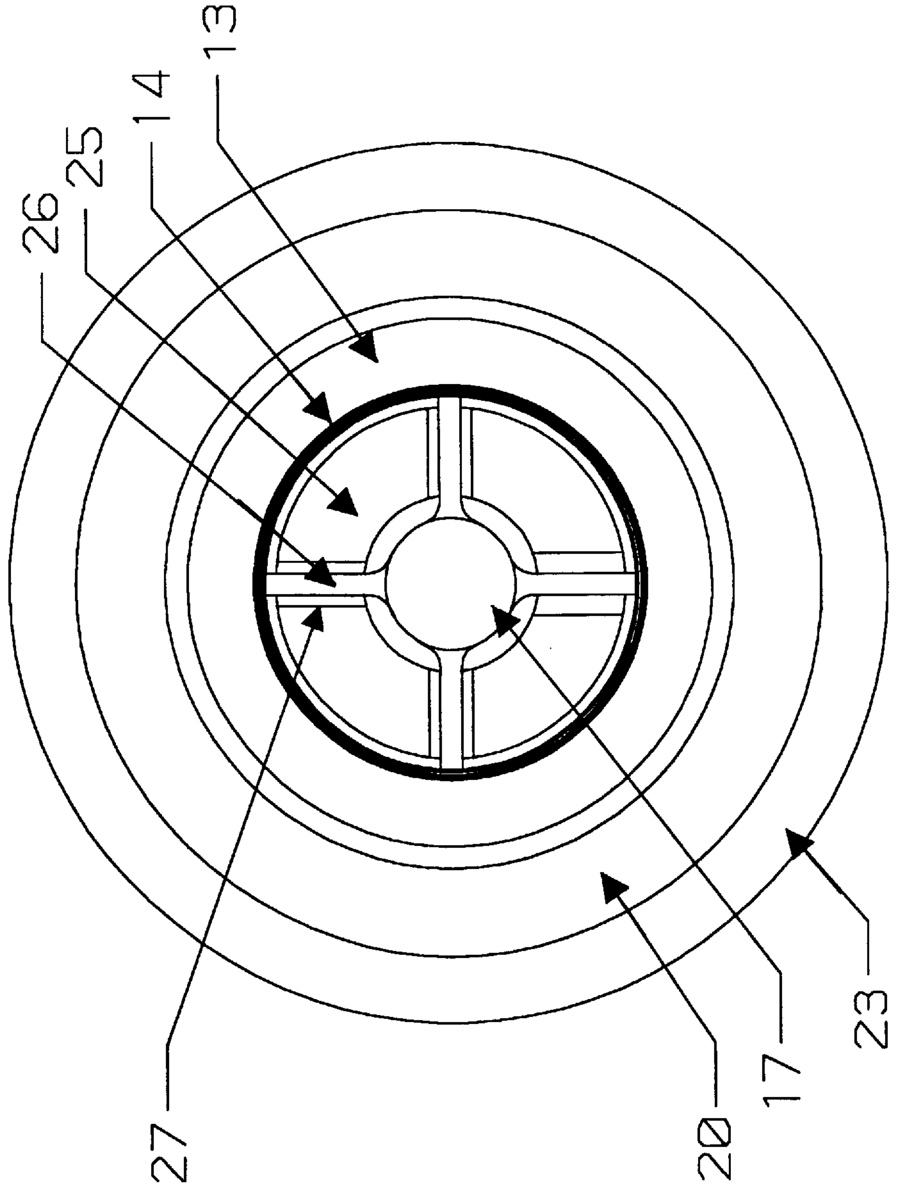
FIG. 3 is an unhatched transverse fragmentary vertical sectional view of the improved motor, taken generally on line 3—3 of FIG. 1.

Referring now to FIGS. 1 and 3, it is seen that drive rod 17 includes an armature support spider having a plurality of spokes, severally indicated at 26. Each spoke 26 is an radially-elongated element of rectangular cross-section, having an outer end and an inner end. Spokes 26 are radially- and circumferentially-spaced about drive rod 17, and are configured and arranged so as to mount current-conducting member 14 to drive rod 17. Hence, conducting member 14 is mounted to drive rod 17 by spokes 26 in a manner somewhat resembling the manner in which a steering wheel is mounted to a steering column.

Figure 2:
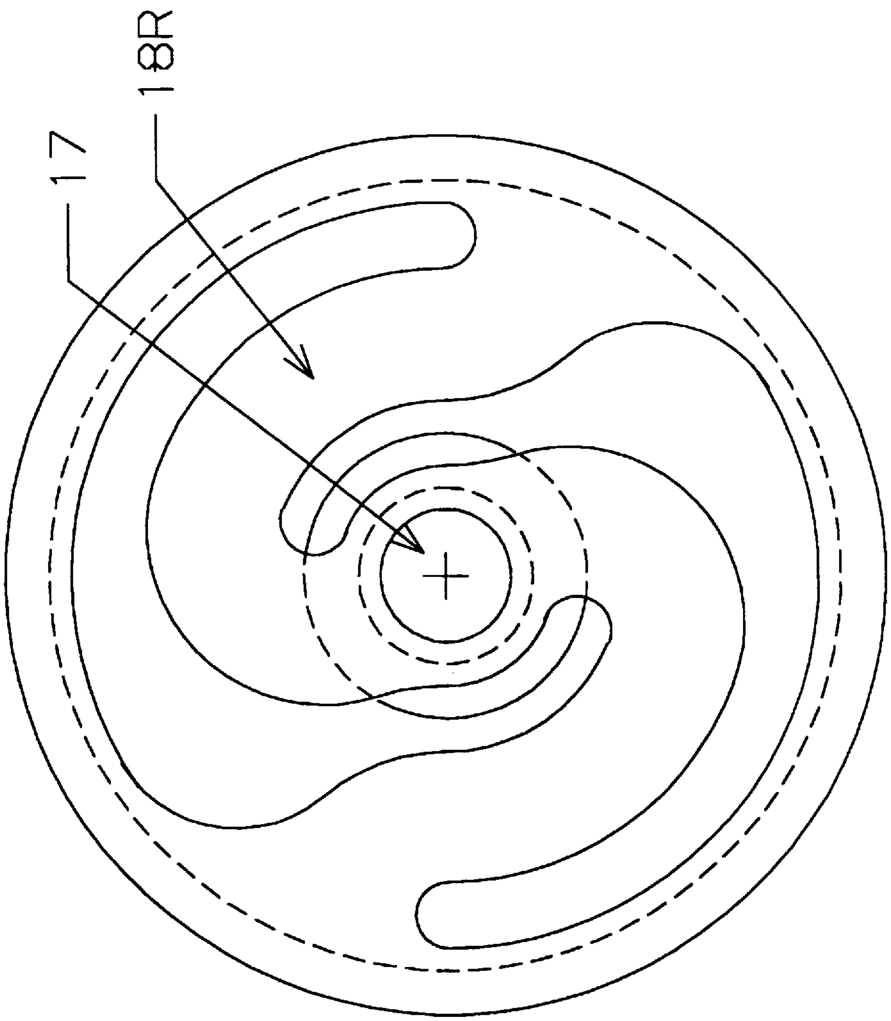
FIG. 2 is a right end elevation of the improved motor shown in FIG. 1.

Referring again to FIG. 1, it is seen that left and right springs 18$_L$ and 18$_R$ are provided at the left and right ends of body 11, respectively. As depicted in FIG. 2, springs 18$_L$, 18$_R$ are so-called "S" spring flexures and are each comprised of an outer ring portion, an inner ring portion, and a pair of thin curved flexure beams, which form the shape of the letter "S". The beams are radially disposed about the inner ring portion, and extend outwardly therefrom. The beams are attached at their outer ends to the outer ring portion. The outer ring portions of springs 18$_L$, 18$_R$ are attached to left polepiece 21$_L$ and right polepiece 21$_R$, respectively. The inner ring portions are attached to drive rod 17 to support drive rod 17 with respect to body 11. In turn, armature 13 and conducting member 14 are mounted to drive rod 17 and also supported with respect to body 11 so as to maintain the constant radial length of a non-working air gap 29.

As best seen in FIG. 1, the present motor 10 is an assembly of a number of nested concentric hollow cylindrical elements, held together by left polepiece 21$_L$ and right polepiece 21$_R$ . Starting from the drive rod 17 and working outwardly, the concentric elements are (a) permanent magnets 15$_L$, 15$_R$, along with left and right center polepieces 24, 25, respectively, (b) current-conducting member 14, (c) armature 13, (d) coil 20, and (e) outer housing 23. These elements are retained by left polepiece 21$_L$ and right polepiece 21$_R$ mounted to the left and right ends of outer housing 23, respectively.

Annular chamber 12 is formed within this assembly and is generally bounded by coil 20, left polepiece 21$_L$, left magnet 15$_L$, left center polepiece 24, right center polepiece 25, right magnet 15$_R$, and right polepiece 21$_R$.

Left permanent magnet 15$_L$ and right permanent magnet 15$_R$ are concentrically disposed about drive rod 17, and are axially positioned between polepieces 21$_L$ and 21$_R$, respectively. In this manner, permanent magnets 15$_L$ and 15$_R$, left center polepiece 24, and right center polepiece 25 are separated from armature 13 to generally define constant-reluctance non-working radial air gap 29. Radial air gap 29 has an elongated ring-like shape. Conducting member 14 is positioned within radial air gap 29.

Armature 13 is positioned axially between left polepiece 21$_L$ and right polepiece 21$_R$. Left polepiece 21$_L$ opposes and faces the left end of armature 13 to define a left working air gap 30. Similarly, right polepiece 21$_R$ opposes and faces the right end of armature 13 to define a right working air gap 31. Armature 13 can move in the axial direction x—x so as to increase and decrease the length of working air gaps 30, 31. For instance, if armature 13 is displaced in a leftward direction, working air gap 30 is decreased in length and working air gap 31 is correspondingly increased in length. Conversely, if armature 13 is displaced in a rightward direction along axis x—x, working air gap 31 is decreased in length and working air gap 30 is correspondingly increased in length. During this translation, non-working air gap 29 remains at a constant radial length.

Air gap 29 is a constant-reluctance non-working air gap because the radial length and cross-sectional area of air gap 29 remain substantially constant as armature 13 moves axially relative to body 11. However, air gaps 30, 31 are variable-reluctance working air gaps because the lengths of these air gaps vary with movement of armature 13. For example, when armature 13 moves rightwardly relative to body 11, the length of air gap 31 is decreased and hence its reluctance is also decreased. Similarly, when armature 13 moves leftwardly relative to body 11, the length of air gap 31 increases, thereby increasing the reluctance of air gap 31.

Magnets 15$_L$, 15$_R$ are preferably formed of a high-reluctance rare earth magnet alloy, such as samarium cobalt. Both magnets 15$_L$, 15$_R$ are annular solid members, elongated along axis x—x, and are generally of equal dimensions and strength. Left magnet 15$_L$ has a vertical annular left end face, an inwardly-facing horizontal cylindrical surface, a vertical annular right end face, and an outwardly-facing horizontal cylindrical surface. Left magnet 15$_L$ is positioned and arranged so as to be in integral contact with left polepiece 21$_L$. Magnet 15$_R$ is configured similarly to magnet 15$_L$, and is substantially a mirror image thereof.

As best seen in FIG. 1, a pair of ferro-magnetic center polepieces 24, 25 are operatively arranged between the facing south (S) poles of magnets 15$_L$, 15$_R$, respectively. Left center polepiece 24 and right center polepiece 25 are of similar construction. Both are annular members, elongated along axis x—x. Specifically, left center polepiece 24 is generally defined by a leftwardly-facing vertical annular surface, an inwardly-facing horizontal cylindrical surface, a rightwardly-facing vertical annular surface, and an outwardly-facing horizontal cylindrical surface. Left center polepiece 24 is in immediate contact with left magnet 15$_L$.

Right center polepiece 25 is of similar construction to left center polepiece 24, and is generally defined by a leftwardly-facing vertical annular surface, an inwardly-facing horizontal cylindrical surface, a rightwardly-facing vertical annular surface, and an outwardly-facing cylindrical surface. Right center polepiece 25 is positioned between right magnet 15$_R$, and left center polepiece 24. As seen in FIG. 3, right center polepiece 25 has four radial slots, severally indicated at 27, cut therethrough to provide clearance for spokes 26. In this respect, right center polepiece 25 has an appearance somewhat similar to a castellated nut. Spokes 26 are provided with adequate clearance within slots 27 for translation and rotation of conducting member 14.

Left polepiece 21$_L$, outer housing 23, right polepiece 21$_R$, armature 13, left center polepiece 24 and right center polepiece 25 are each formed of a magnetically conductive material, such as iron. Conducting member 14 is comprised of an electrically conductive material, preferably copper.

Coil 20 is an annular member, elongated along axis x—x, and mounted between left polepiece $\mathbf{21}_L$ and right polepiece $\mathbf{21}_R$. Coil 20 encircles chamber 12 and armature 13. The coil is wound on a hollow cylindrical dielectric bobbin (not shown) disposed between the coil and armature.

OPERATION OF THE INVENTION

Figure 4:
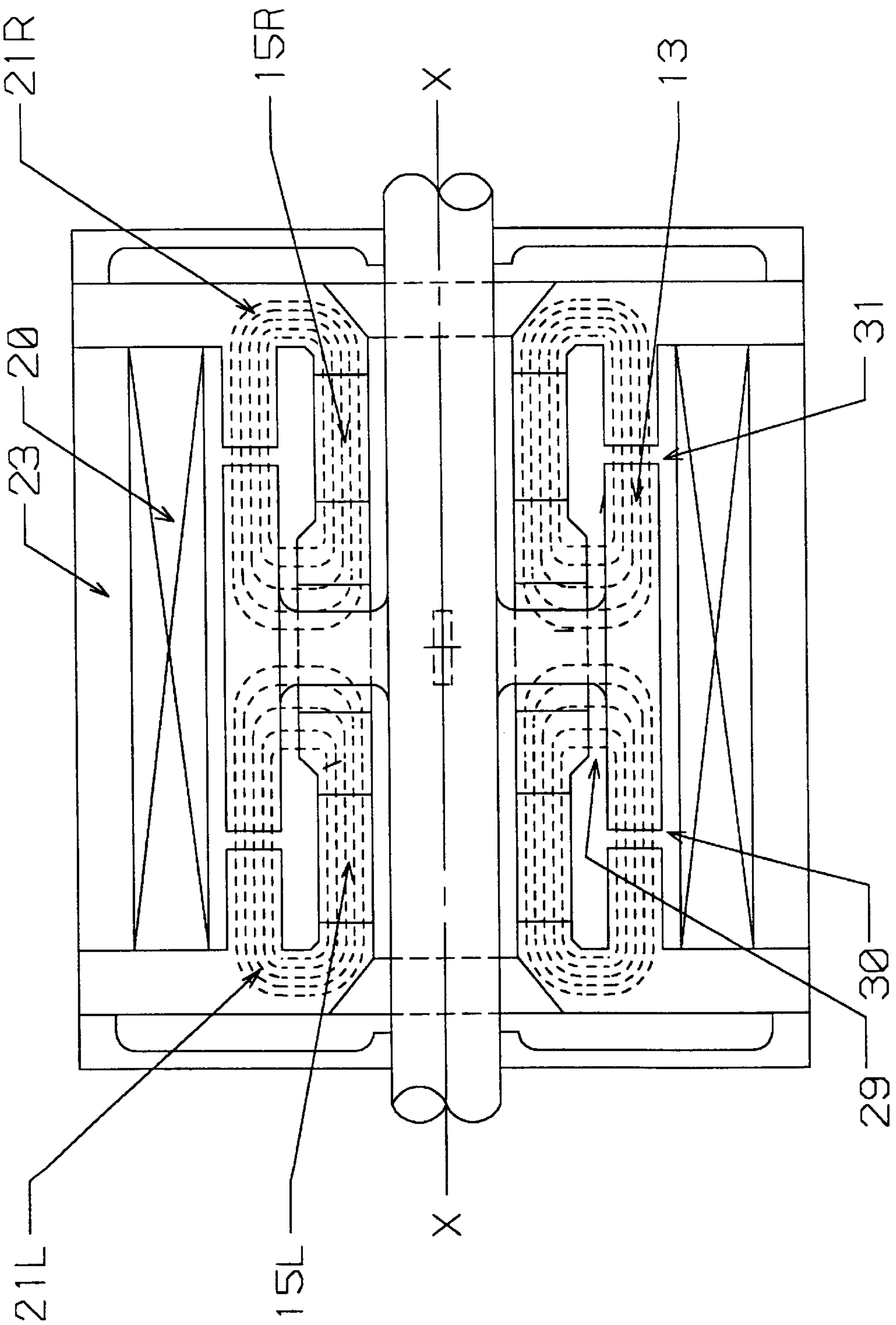
FIG. 4 is a view similar to FIG. 1, showing the armature in a centered position relative to the body such that both working air gaps are of substantially equal length, and showing the paths of magnetic flux produced by the permanent magnets through the working and non-working air gaps.
Figure 5:
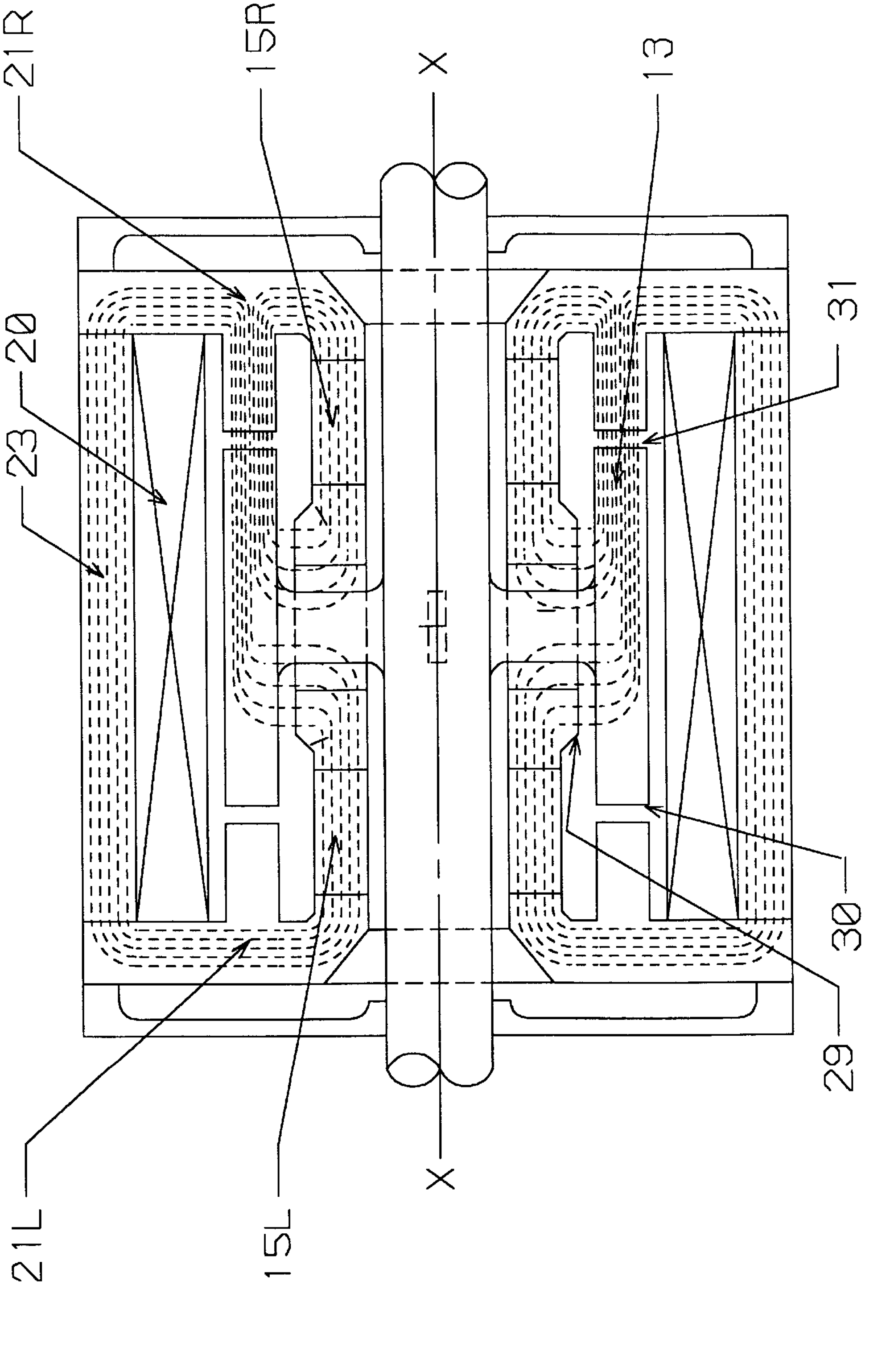
FIG. 5 is a view similar to FIG. 4, but showing the effect of coil magnetizing current on the motor magnetic flux paths.

As in typical force motors, the present motor functions by superimposing coil-induced flux on polarized permanent magnet flux in the working air gaps. As best seen in FIGS. 4 and 5, air gaps 30, 31 contain a net magnetic flux that is the algebraic sum of a constant flux attributable to both permanent magnets $\mathbf{15}_L$, $\mathbf{15}_R$ and a variable flux attributable to coil 20 (not shown). For clarity, conducting member 14, although present, is not depicted in FIGS. 4 and 5. It is noted that non-working air gap 29 contains a constant magnetic flux attributable only to permanent magnets $\mathbf{15}_L$, and $\mathbf{15}_R$. The variable flux generated by coil 20 does not cross non-working air gap 29. The resulting addition and subtraction of flux effectively unbalances the magnetic tractive forces on armature 13, increasing the force on one end while decreasing it on the other, resulting in a net output force on armature 13. This superposition of flux is illustrated in FIGS. 4 and 5, where armature 13 is shown centered (i.e., gaps 30 and 31 are of equal length). Left and right magnets, $\mathbf{15}_L$, $\mathbf{15}_R$, create respective, oppositely-polarized inner toroidal flux paths through left and right air gaps, 30 and 31, respectively, as shown by the dashed line loops in FIG. 4.

Similarly, current flow in coil 20 will induce an outer toroidal flux path (not shown) surrounding the coil. This flux path passes, in turn, through outer housing 23, left pole piece $\mathbf{21}_L$, working air gap 30, armature 13, working air gap 31, and right pole piece $\mathbf{21}_R$. It is significant to note that as the current in coil 20 is increased and decreased, the toroidal lines of flux around the coil expand and contract but do not cut through conducting member 14 (omitted for clarity), positioned on the inside of armature 13. Hence, the current in the coil does not induce eddy currents related to the dynamic change of flux. If conducting member 14 was positioned on the outside of armature 13, it would be subject to eddy current induction and hence would give rise to undesirable lags in the buildup of current in coil 20.

FIG. 5 shows the effect of supplying maximum design current to coil 20. This maximum current produces a toroidal flux around coil 20 that has a magnitude approximately equal to the magnitude of the flux developed by each of the magnets. The net effect is to double the magnetic flux in gap 31, where the fluxes add, and to reduce the magnetic flux in gap 30 to approximately zero, where the fluxes subtract. The flux through left magnet $\mathbf{15}_L$ is effectively rerouted to pass through outer housing 23 instead of passing through gap 30. As noted previously, the flux passing through each of the magnets, and hence passing through fixed, non-working air gap 29, remains constant. Movement of conducting member 14 through non-working air gap 29 induces eddy currents in member 14 and results in eddy current damping. Generally, such motion is substantially perpendicular to the constant flux present in non-working air gap 29. This configuration produces eddy currents that are a function of the velocity of armature 13 relative to body 11 but are not a function of changes in the flux attributable to coil 20 or the armature position.

Displacement of armature 13 (in the absence of coil current) will result in a redistribution of the flux similar to the flux line pattern shown in FIG. 5. This illustrates what would happen if armature 13 were moved to the right, decreasing the reluctance of air gap 31 and increasing the reluctance of air gap 30. Again, the flux through non-working air gap 29 remains constant.

MODIFICATIONS

The present invention contemplates that many modifications may be made. The particular materials of which the various body parts and components are formed are not deemed critical, and may be readily varied. Although samarium cobalt has been cited as the preferred magnet material, other rare earth magnet alloys, or other magnet materials, may be substituted therefore. Similarly, the particular shape of the individual component body parts may be altered, modified or varied by a skilled designer. The various component parts may be contiguous or independent, as desired. While a linear embodiment of the present invention is disclosed, the present invention may also be configured in rotary embodiments.

The invention broadly discloses an improved electromagnetic force motor with internal eddy current damping which has a number of operational advantages. The motor may be adapted to many possible uses, such as controlling the movement or displacement of a valve element relative to a seat or a port, with increased damping characteristics. However this possible use is illustrative only, and should not be viewed as limiting the scope of the following claims. The possible uses and applications for the improved motor are widespread and varied.

Additional embodiments may be envisioned to increase the magnetic flux found in non-working air gap 29 independently of the flux in the working air gaps. For example, the flux could be increased by providing additional permanent magnets, arranged facing an additional center polepiece and located between center polepieces 24 and 25. These magnets would generate additional magnetic flux across non-working air gap 29 so that when conducting member 14 is moved through this lengthened magnetic field, eddy currents of a greater magnitude would be generated to provide increased damping of armature velocity.

In addition, the current-conducting member could have many different configurations. While the preferred material for this member is copper, any electrically conductive material, such as aluminum, or any low resistivity alloy would be appropriate. In addition, the current-conducting member may be designed to vary the amount of damping. For example, eddy currents may be controlled or suppressed by either interfering with the formation of continuous circuits or by reducing the conductivity of the material being moved through the magnetic field. Eddy currents may be reduced by providing an axially-elongated conducting member with a plurality of axial slots. These slots would interrupt the eddy flow paths, and hence, increase the resistance to eddy current flow. This increased resistance will decrease the magnitude of the eddy currents, and reduce the overall motor damping.

Similarly, the conducting member may be made of varying lengths and thicknesses so as to vary the eddy currents generated therein. Further, the particular configuration and location of the conducting member with respect to the non-working air gap may be varied by any person having ordinary skill in the art. The conducting member could be designed to move rotationally as well as linearly, or any combination of the two. Numerous configurations and modifications of the preferred embodiment may be provided which vary the component of motion of the current-conducting member perpendicular to the magnetic flux.

Therefore, while the presently-preferred form of the electromagnetic force motor has been shown and described, and several modifications thereof discussed, persons skilled in this art will readily appreciate that various additional changes and modifications may be made without departing from the spirit of the invention, as defined and differentiated by the following claims.

What is claimed is:

1. In a motor having an armature mounted for limited displacement relative to a body, having a high reluctance permanent magnet, and having an electromagnetic coil, said body and armature being adapted to conduct magnetic flux, said armature defining with said body a plurality of variable-reluctance working air gaps and at least one constant-reluctance non-working air gap, each of said working air gaps containing a net flux that is the algebraic sum of a flux attributable to said magnet and a flux attributable to said coil, said non-working air gap containing only flux attributable to said magnet, the improvement which comprises:

a current-conducting member attached to said armature and arranged to move in said non-working air gap in a direction having a component substantially perpendicular to the flux therein such that eddy currents will be induced in said member to damp the velocity of said armature;

the elements of said motor being so configured and arranged that said eddy currents are a function of the velocity of said armature relative to said body, but are not a function of changes in the flux attributable to said coil or attributable to the position of said armature relative to said body.

2. The improvement as set forth in claim 1 wherein said armature moves linearly relative to said body.

3. In a motor having an armature mounted for limited displacement relative to a body, having a high reluctance permanent magnet, and having an electromagnetic coil, said body and armature being adapted to conduct magnetic flux and operatively arranged to produce variable magnetic forces on said armature as a function of the current in said coil, the improvement which comprises:

a current-conducting member mounted on said armature so as to move through magnetic flux attributable to said magnet to produce eddy current damping of the velocity of said armature;

the elements of said motor being so configured and arranged that magnetic flux attributable to changes in the current in said coil or attributable to changes in the position of said armature relative to said body does not pass through said conducting member.

4. The improvement as set forth in claim 1 wherein said motor includes a first portion adapted to conduct flux attributable to said coil through said working air gaps and said armature, and includes a second portion that contains said permanent magnet and said non-working air gap, and wherein said armature is arranged in said first and second portions.

5. The improvement as set forth in claim 4 wherein said first and second portions are cylindrical and concentric, and wherein said working air gaps and said armature are arranged in said first and second portions, and wherein said current-conducting member is arranged within said second portion.

* * * * *